March 28, 1967   G. DE COYE DE CASTELET   3,311,364

MOUNTING OF MOTOR VEHICLE SUSPENSION ARMS

Filed June 7, 1965

Inventor
Gaetan De Coye De Castelet

Attorneys

United States Patent Office 3,311,364
Patented Mar. 28, 1967

3,311,364
MOUNTING OF MOTOR VEHICLE SUSPENSION
ARMS
Gaëtan de Coye de Castelet, Billancourt, France, assignor to Regie Nationale des Usines Renault, Billancourt, France, a French works
Filed June 7, 1965, Ser. No. 461,917
Claims priority, application France, July 3, 1964, 980,656, Patent 1,408,374
1 Claim. (Cl. 267—22)

This invention relates to the mounting of motor vehicle suspension arms and more particularly to improvements in the disposition of the longitudinal arms carried by pivot-forming shafts extending transversely of the chassis, the respective pivot shafts for the arms of the two rear wheels overlapping each other over a major part of their length. Arrangements of this kind are described and illustrated in the applicant's Patent No. 3,158,365, of Nov. 24, 1964.

The subject improvements of this invention relate principally to the link between the two pivot shafts, which shafts may be tubular whereby to form a one-piece unit connected to the vehicle body through the medium of highly flexible rubber blocks. The invention likewise relates to certain detail arrangements which will be more particularly described hereinafter with reference to the accompanying non-limitative exemplary drawing, in which.

Figure 1:
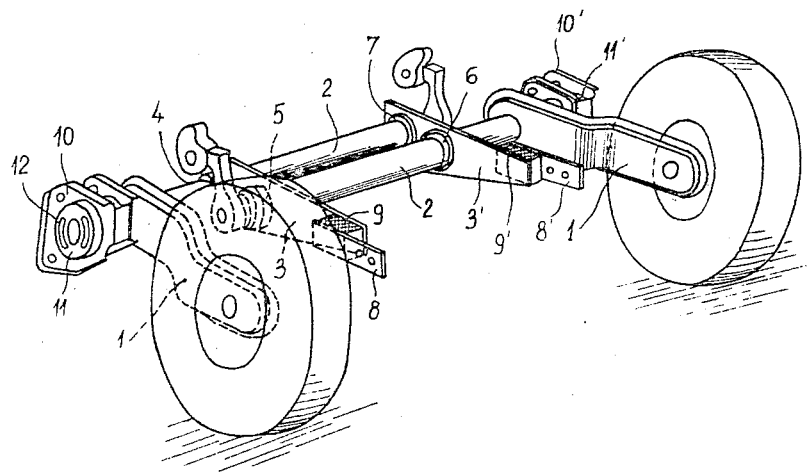
FIGURE 1 is an illustration of the wheel arms and their pivot shafts mounted in accordance with the invention.
Figure 2:
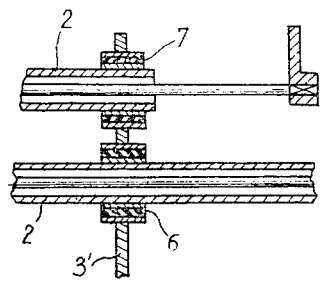
FIGURE 2 is a detail view of the mounting of the arm tubes in their interconnecting plates.
Figure 3:
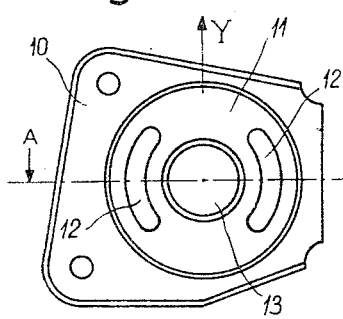
FIGURE 3 is an end elevation, on an enlarged scale, of the arm-bearing tube.
Figure 4:
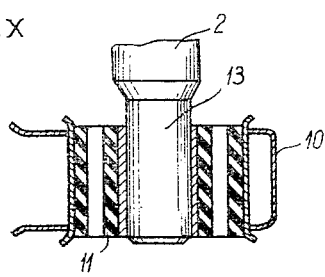
FIGURE 4 shows in section taken on the line A–B of FIGURE 3 the manner of mounting the outer end of the arm-bearing tube in a chassis bearing.

Referring to the accompanying drawing and more particularly to FIGURES 1 and 2, it will be seen that the wheel-bearing arms 1 are fixed to the two tubular arm-pivot-shafts 2, adjacent the outer ends thereof. The tubes 2 are interconnected by means of two supporting steel plates 3, $3^1$ which house the two tubes through the medium of elastic bearing forming rubber linings 4, 5 and 6, 7.

The two interconnecting plates 3, $3^1$ are connected to two metal lugs 8, $8^1$ which are rigidly secured to the vehicle body through the medium of highly flexible rubber blocks 9, $9^1$, whereby to reduce the vibration transmitted to a minimum and introduce additional filtration.

The main wheel loads are transmitted, in accordance with a well known arrangement, by the linings of the outer arm bearings 10, $10^1$ in the chassis, which are located level with the wheels. The bearing linings 11, $11^1$ are each formed of a large flexible rubber block embodying circular recesses 12, whereby the longitudinal flexibility along the arrow X imparted to the bearing is greater than the vertical flexibility along the arrow Y in order to reduce vibration transmitted by the rolling motion of the tyres.

The flexible block 11 is driven onto the end 13 of tube 2 and onto the bearing support 10.

The recesses 12 are so determined as to ensure limited travel during braking or when large turning moments are developed, the inner part of the recess butting against the outer part, in order not to detract from roadholding qualities.

Wheel springing as such may be provided by means of torsion bars suitably mounted inside the tubular shafts 2.

What is claimed is:

In a road vehicle having at least two suspension arms on each of which a vehicle wheel is mounted, the improvement comprising a pair of pivot shafts overlapping each other over a substantial portion of their lengths, each of said arms being rigidly mounted on a corresponding shaft, a pair of support plates extending at right angles to said shafts and having elastic bearing means through which said shafts extend to interconnect said shafts, and a pair of flexible rubber blocks extending from said plates and connecting said plates to the vehicle body, whereby the arms and their associated shafts form a one-piece unit.

No references cited.

ARTHUR L. LA POINT, *Primary Examiner.*

R. M. WOHLFARTH, *Assistant Examiner.*